(12) United States Patent
Webb

(10) Patent No.: US 7,946,222 B2
(45) Date of Patent: May 24, 2011

(54) FOOD ITEM PRESS

(76) Inventor: Nicholas Webb, Redding, CA (US)

( * ) Notice: Subject to any disclaimer, the term of this patent is extended or adjusted under 35 U.S.C. 154(b) by 774 days.

(21) Appl. No.: 12/026,086

(22) Filed: Feb. 5, 2008

(65) Prior Publication Data
US 2009/0193981 A1 Aug. 6, 2009

(51) Int. Cl.
*A47J 19/06* (2006.01)
*B30B 9/06* (2006.01)

(52) U.S. Cl. ............... 99/349; 99/353; 99/510; 99/537; 100/234; 100/243; 241/169; 241/169.1; 30/114

(58) Field of Classification Search ............ 99/349, 99/353, 495, 506, 509, 510, 537; 100/112, 100/234, 243, 126; 241/91, 169, 169.2; 425/282, 425/284, 285, 376.1; 83/356.3, 932, 437.2, 83/435; 264/323, 310, 293, 167, 166; 30/114
See application file for complete search history.

(56) References Cited

U.S. PATENT DOCUMENTS

| | | | |
|---|---|---|---|
| 207,974 A | 9/1878 | McConnell | 99/340 |
| 3,262,404 A | 7/1966 | Morz et al. | 107/52 |
| 3,264,685 A | 8/1966 | Boggild et al. | 18/12 |
| 3,327,621 A | 6/1967 | Zysset | 100/125 |
| 4,095,339 A * | 6/1978 | Turner | 30/114 |
| 4,545,299 A | 10/1985 | Ahner | 100/112 |
| 5,101,720 A | 4/1992 | Bianci | 100/99 |
| 5,303,640 A | 4/1994 | Gaber et al. | 99/495 |
| 5,490,454 A | 2/1996 | Ancona et al. | 99/510 |
| 5,520,104 A | 5/1996 | Ancona et al. | 99/495 |
| 6,644,179 B1 * | 11/2003 | Kiehm | 99/510 |
| D500,642 S | 1/2005 | McGuyer | D7/666 |
| D513,156 S | 12/2005 | Wright | D7/666 |
| D516,390 S | 3/2006 | Wright et al. | D7/666 |
| D521,814 S | 5/2006 | Dorion | D7/665 |
| 7,117,785 B2 * | 10/2006 | Walker, III | 100/126 |
| 7,395,753 B2 * | 7/2008 | Dorion | 99/495 |
| 2009/0078131 A1 * | 3/2009 | So et al. | 100/234 |

FOREIGN PATENT DOCUMENTS

WO 03222162 5/2003

* cited by examiner

*Primary Examiner* — Reginald L Alexander
(74) *Attorney, Agent, or Firm* — Walter J. Tencza, Jr.

(57) ABSTRACT

An apparatus is provided for pressing a food item into a plurality of sliced configurations. The apparatus may include a top handle device, a bottom handle device, a wheel or basket and a plunger. The top handle device may be connected to the wheel so that the top handle device rotates with respect to the wheel. The plunger may be fixed to the top handle device. The wheel may be fixed to the bottom handle device. The wheel may have a plurality of sections into which a portion of the plunger can be inserted in order to press a food item into a sliced configuration.

22 Claims, 26 Drawing Sheets

FOOD ITEM PRESS

FIELD OF THE INVENTION

This invention relates to improved methods and apparatus concerning pressing food items, such as garlic.

BACKGROUND OF THE INVENTION

For the past several decades it has been common to press garlic by placing a peeled garlic clove in a die-cast or injection molded press that is typically comprised of a lower handle member that includes a lever portion and a cup that incorporates a plurality of round extrusion holes. This aspect is attached by a hinge to an upper handle that incorporates and presses the clove of garlic through the extrusion holes. One company AMCO (trademarked) produces a garlic press that incorporates two plungers and two extrusion wells, one for slicing and one for pressing.

SUMMARY OF THE INVENTION

One or more embodiments of the present invention provide a food item press, such as a garlic press, which provides a four-in-one food item press tool accommodating a plurality of food item recipes, such as garlic recipes, such as virtually all garlic recipes. In at least one embodiment, the device is comprised of a lower handle member or bottom handle device with an elongated resilient handle that includes ergonomic features. At an end portion of the lower handle member is a circular structure, wheel, or basket, that is divided by four axial structures. The four axial structures serve to receive an extrusion basket or wheel that is comprised of four different extrusion configurations corresponding to four different wells or sections. The four wells include a first well having a plurality of small extrusion holes, a second well providing a grid structure that creates a Julian cut, a third well or structure that includes slots that can dice a food item, such as clove, and lastly a fourth well or section, having a plurality of larger holes for a more course extrusion. The basket is rotated to position underneath the plunger of an upper handle that includes the extrusion plunger and is locked in place when the basket slots nest into axial spokes of the lower handle device or structure.

In one embodiment of the present invention, an apparatus is provided for pressing a food item into a plurality of sliced configurations. The apparatus may include a top handle device, a bottom handle device, a wheel or basket and a plunger. The top handle device may be connected to the wheel so that the top handle device rotates with respect to the wheel. The plunger may be fixed to the top handle device. The wheel may be fixed to the bottom handle device. The wheel may have a plurality of sections into which a portion of the plunger can be inserted in order to press a food item into a sliced configuration.

The plurality of sections of the wheel may include first, second, third, and fourth sections. Each of the first, second, third, and fourth sections of the wheel may be bounded by walls, and may have a set of extrusion openings which are different from the other sections of the first, second, third, and fourth sections of the wheel. For example, each of the extrusion openings of the set of extrusion openings of the first, second, third, and fourth sections may be in the form of a circular hole, a larger circular hole, an elongated slot, and a substantially square opening, respectively. The set of extrusion openings of the first, second, third, and fourth sections may be configured to create a first set of cylinders of a food item, a second larger set of cylinders of a food item, a diced food item, and a Julian cut food item, respectively, when the plunger presses the food item.

The top handle device may have a first end which is connected to the wheel and a second end. The plunger may be fixed to an underside of the top handle device, near the first end of the top handle device, and substantially perpendicular to the top handle device. The top handle device may be connected to the wheel so that the top handle device can rotate in a first plane which is substantially parallel to the wheel and to the bottom handle device and so that the top handle device can rotate in a second plane which is substantially perpendicular to the wheel and to the bottom handle device. The plunger may be configured to fit snugly into each of the plurality of sections. The plunger may have a substantially pie shaped section which fits snugly into each of the plurality of sections.

At least one embodiment of the present invention includes a method comprising using an apparatus to press a food item into one of a plurality of sliced configurations. The apparatus be configured and/or may have one or more of the features previously described.

DETAILED DESCRIPTION OF THE DRAWINGS

Figure 1:
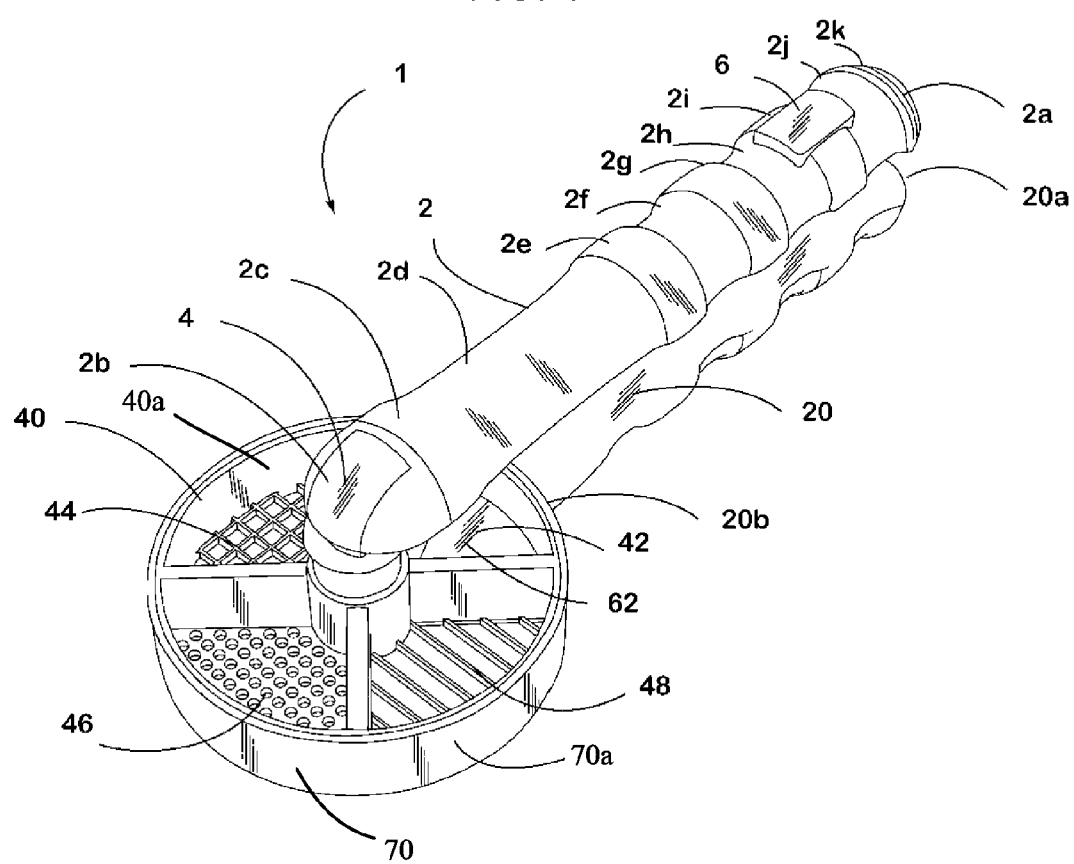
FIG. 1 shows a top front right side perspective view of a garlic press in accordance with one embodiment of the present invention, with the garlic press shown in a compressed state.

FIG. 1 shows a top front right side perspective view of a garlic press 1 in accordance with one embodiment of the present invention, with the garlic press 1 shown in a compressed state. FIGS. 2, 3, 4, 5, 6, and 7 show front, back, left side, right side, bottom, and top views of the garlic press 1 in the compressed state.

Figure 4:
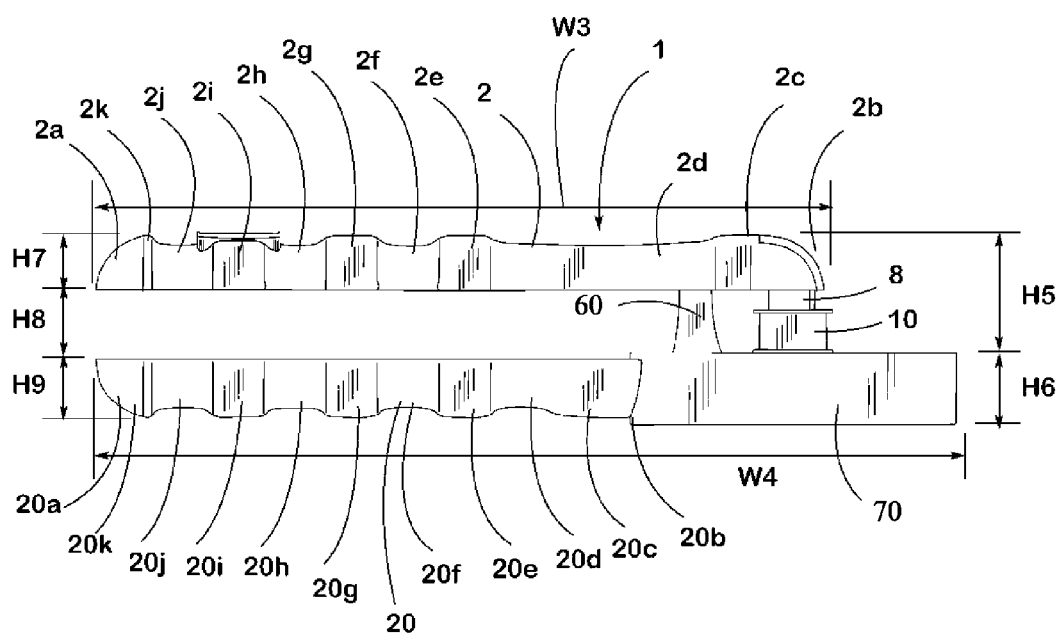
FIG. 4 shows a left side view of the garlic press of FIG. 1 in the compressed state.

The garlic press 1 includes a top handle device 2, a bottom handle device 20, and a wheel 40. The top handle device 2 is connected to the wheel 40 by a pin 8, and a device 10 as shown in FIG. 4, so that the wheel 40 can rotate with respect to the top handle device 2. The bottom handle device 20 includes an end 20a and an opposite end 20b which is fixed to the wheel 40.

Figure 22:
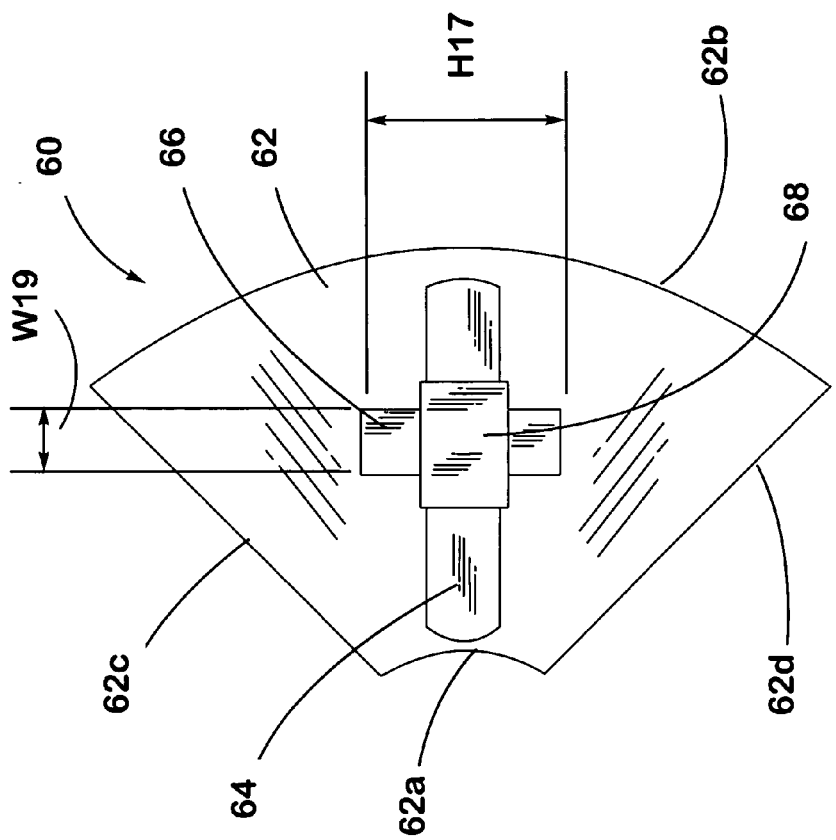
FIG. 22 shows a top view of the plunger.

The top handle device 2 includes ridged or protruding portions 2c, 2e, 2g, 2i, and 2k, and curved or indented portions 2d, 2f, 2h, and 2j. The top handle device 2 is configured so that it can be more easily gripped by a hand of a user. The top handle device 2 may have a trademarked logo portion 6 with a company and/or product name printed on it. The top handle device 2 is connected to a plunger 60 so that the plunger 60 can pivot with respect to the top handle device 2. The plunger 60, as shown in FIGS. 18-23, includes a pin 66 which is connected to the top handle device 2 so that the plunger 60 can pivot with respect to the top handle device 2. The plunger 60 further includes a portion 68, a stem 64 and a wedge shaped portion 62. As shown in FIG. 22, the wedge shaped portion 62 has a large arc end 62b, a small arc end 62a, and straight sides 62c, and 62d.

Figure 12:
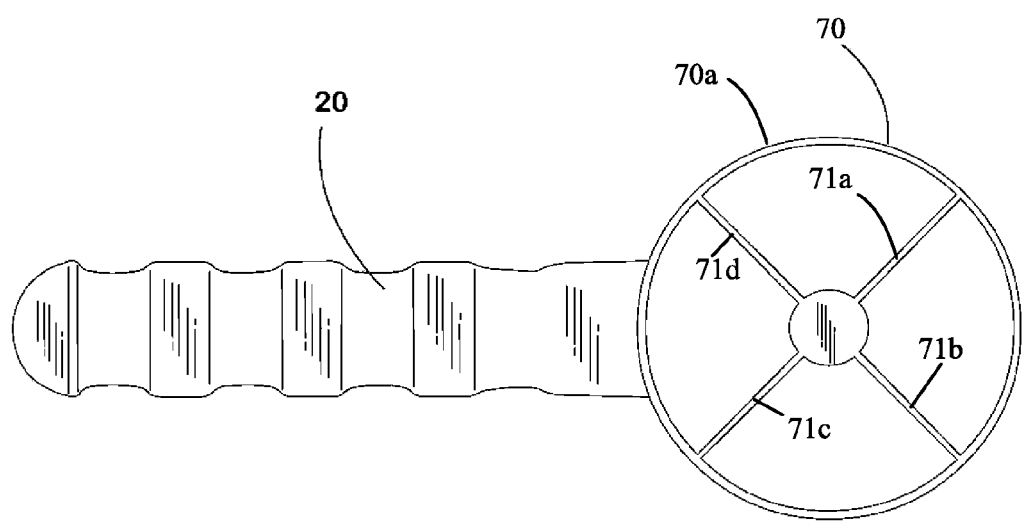
FIG. 12 shows a bottom view of part of the garlic press of FIG. 1 with the top handle removed and portions of a wheel removed.

The bottom handle device 20 includes ridged or protruding portions 20c, 20e, 20g, 20i, and 20k, which typically are directly across from ridged or protruding portions 2c, 2e, 2g, 2i, and 2k of the top handle device 2, respectively. The bottom handle device 20 as shown in FIG. 12 includes a circular structure 70 having an outer peripheral wall 70a, and the bottom handle device 20 also include axial structures 71a, 71b, 71c, and 71d.

Figure 14:
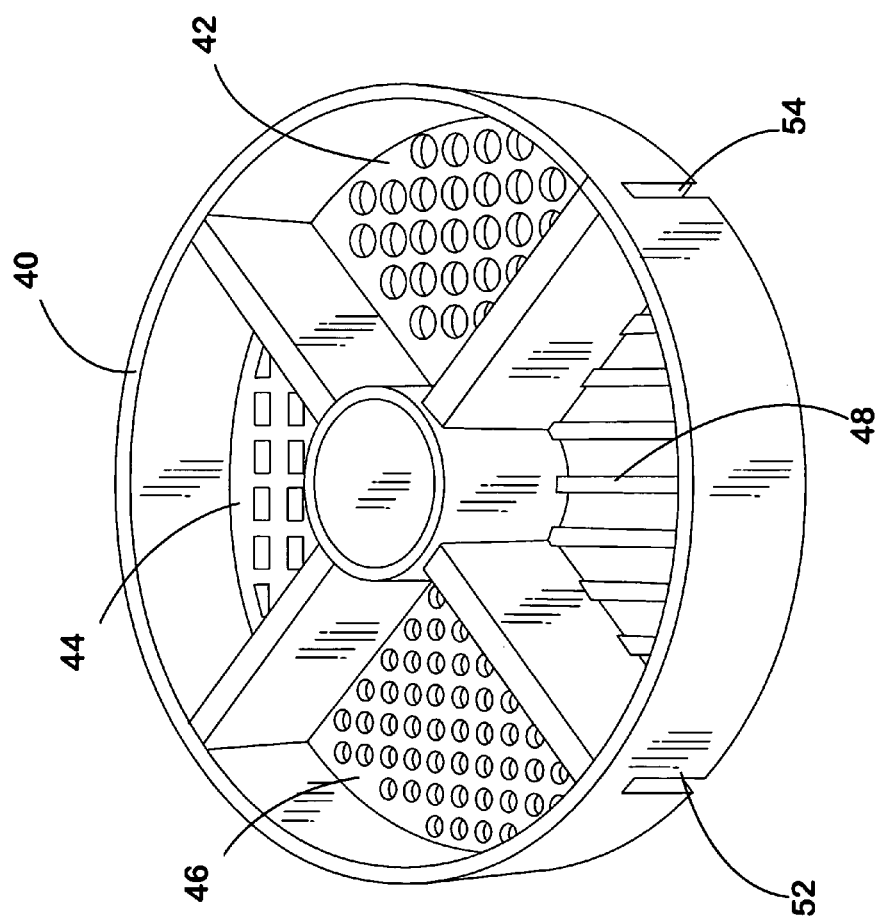
FIG. 14 shows a top front perspective view of the wheel of the garlic press of FIG. 1.
Figure 16:
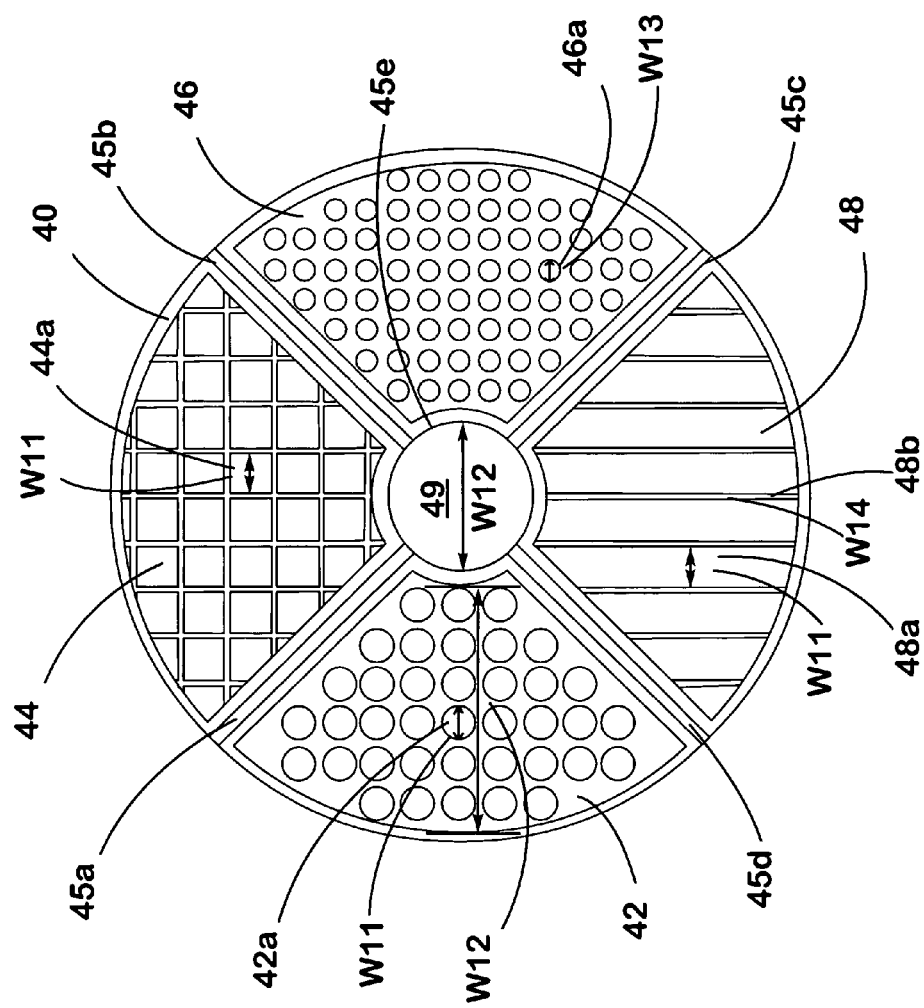
FIG. 16 shows a top view of the wheel.
Figure 17:
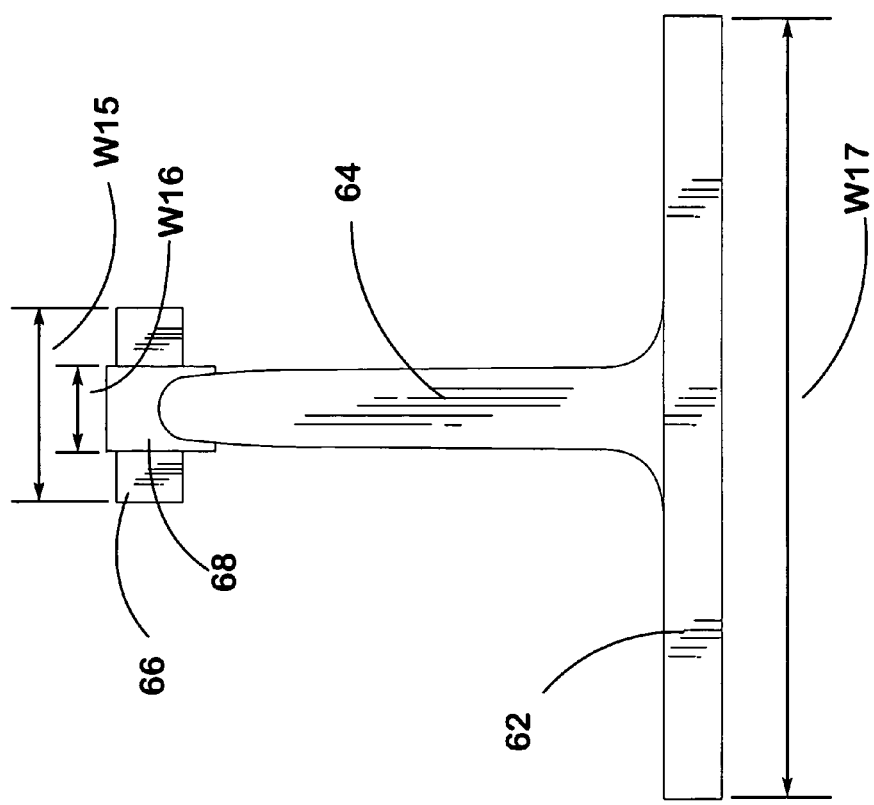
FIG. 17 shows a back view of a plunger.

The wheel 40 may include sections 42, 44, 46, and 48 shown in FIGS. 14 and 16. The section 42 may have a plurality of openings, including opening 42a. Each of the plurality of openings of the section 42, such as 42a, may be circular, and each may have a diameter of W11, which may be 0.11 inches. The section 44 may have a plurality of openings, such as 44a, each of which may be square and each of which may have a side of W11 which may be 0.11 inches. The section 46 may have a plurality of openings, such as 46a, each of which may be circular and each of which may have a diameter of W13, which may be 0.08 inches. The section 48 may have a plurality of slot openings, such as 48a, each of which may have a width of W11, which may be 0.11 inches. The slots openings may be separated by members, such as 48b, each of which may have a width of W14, which may be 0.05 inches. The basket or wheel 40 may have a central opening 49 which may have a diameter of W12 inches, which may be 0.58 inches. The wheel 40 may have an outer peripheral wall 40a, inner straight walls or axial spokes 45a, 45b, 45c, and 45d, and a circular inner wall 45e surrounding the central opening 49, shown in FIG. 16.

Figure 15:
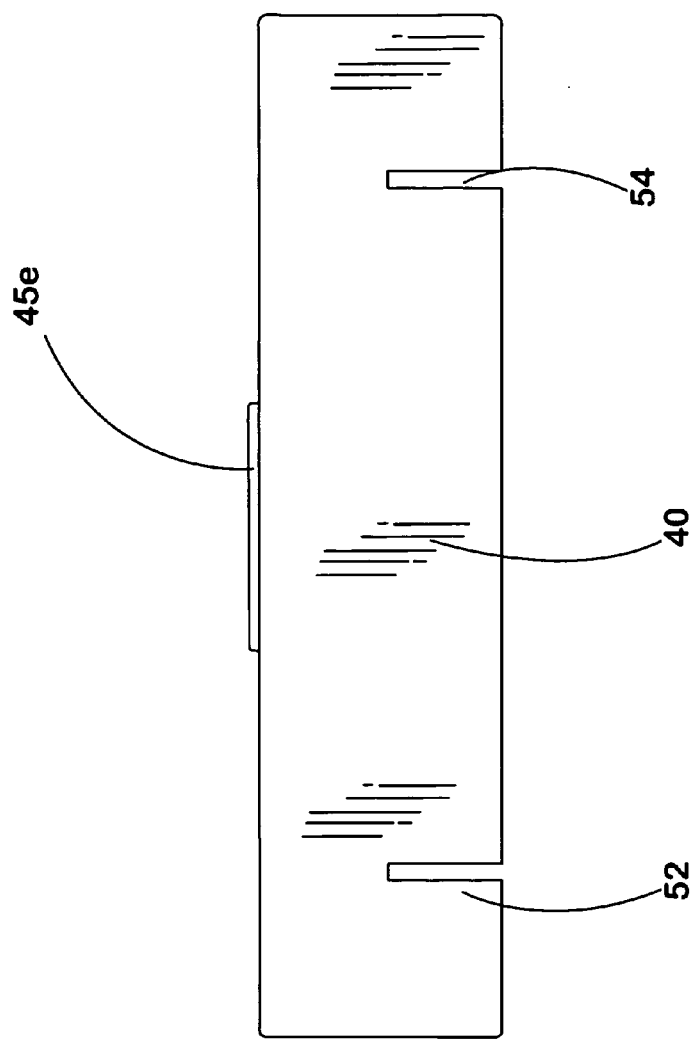
FIG. 15 shows a back view of the wheel.

The wheel 40 may have slot openings 52 and 54 shown in FIG. 15 which allow the wheel 40 to fall into place so the plunger section 62 of the plunger 60 can fit into one of the designated opening or section of sections 42, 44, 46, and 48.

Figure 2:
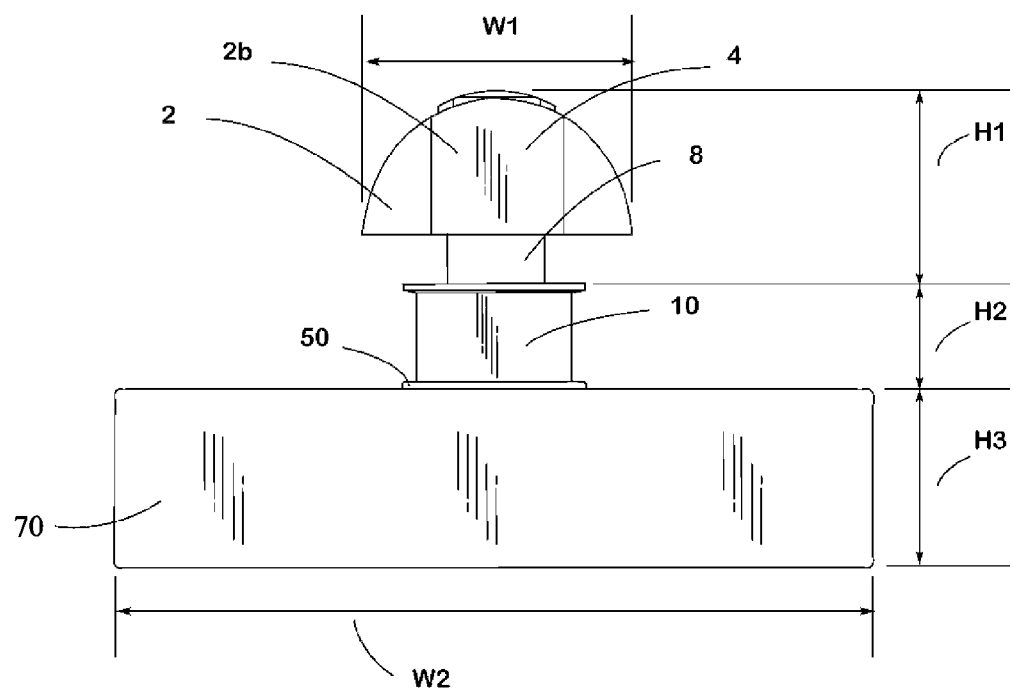
FIG. 2 shows a front view of the garlic press of FIG. 1 in the compressed state.

As shown in FIG. 2, the top handle device 2 may have a width, W1, which may be 0.99 inches. The circular structure 70 may have a diameter which may be W2 inches, such as 2.78 inches. The circular structure 70 may have a height H3 which may be 0.62 inches. The portion or device 10 may have a height H2 which may be 0.36 inches. The height, H1, shown in FIG. 2 may be 0.63 inches.

Figure 3:
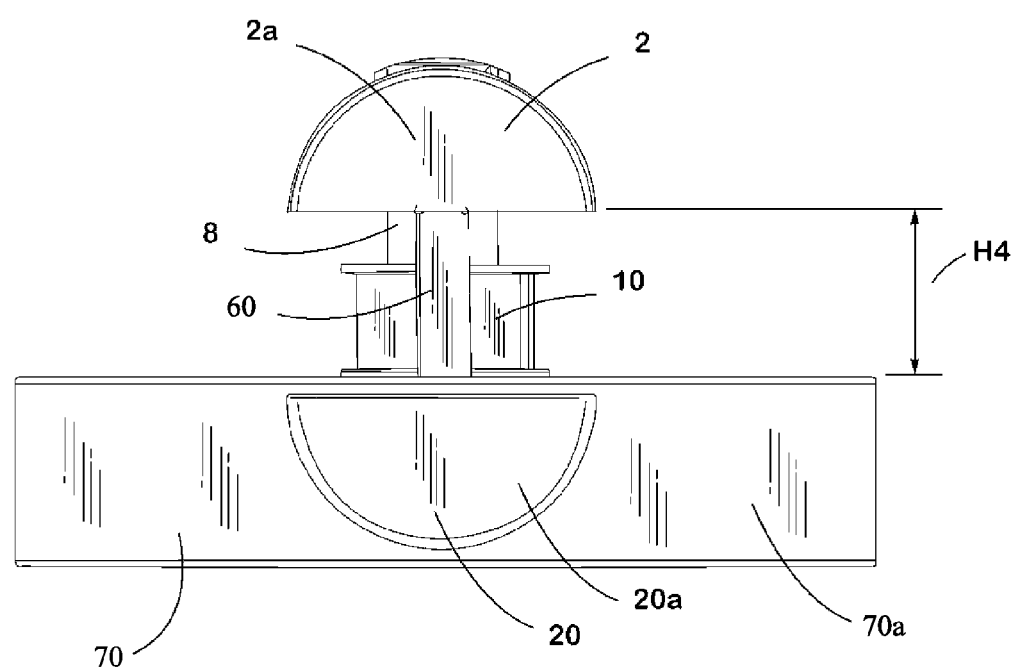
FIG. 3 shows a back view of the garlic press of FIG. 1 in the compressed state.

The gap or spacing, H4 shown in FIG. 3, between the top handle device 2 and the bottom handle device 20, when the top handle device 2 is in a fully compressed state, may be 0.53 inches. The length W3, of the top handle device 2, as shown in FIG. 4, may be 6.2 inches. The length W4 from the end 20a of the bottom handle device 20 and a distal end of the circular structure 70 may be 7.33 inches. The ridge 2k of the top handle device 2 may have a thickness or height H7 which may be 0.49 inches. The ridge 20k of the bottom handle device 20 may have a thickness or height H9 shown in FIG. 4, which may be 0.51 inches. The gap between the end 2a and the end 20a, shown as H8 in FIG. 4, may be 0.57 inches. The circular structure 70 may have a thickness of H6 which may be 0.62 inches. The distance between the top part of the top handle device 2 and a proximal portion of the circular structure 70 may be H5, which may be one inch.

Figure 5:
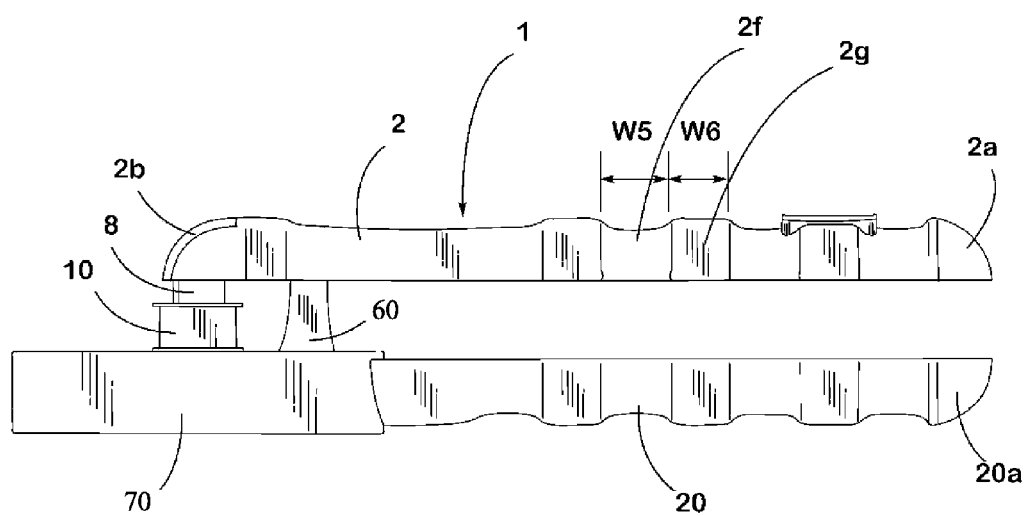
FIG. 5 shows a right side view of the garlic press of FIG. 1 in the compressed state.

The indentations of the top handle device 2, such as indentation 2f may have a width W5 of about 0.49 inches as shown in FIG. 5. The protrusions of the top handle device 2, such as the protrusion 2g may have a width W6 of 0.49 inches.

Figure 6:
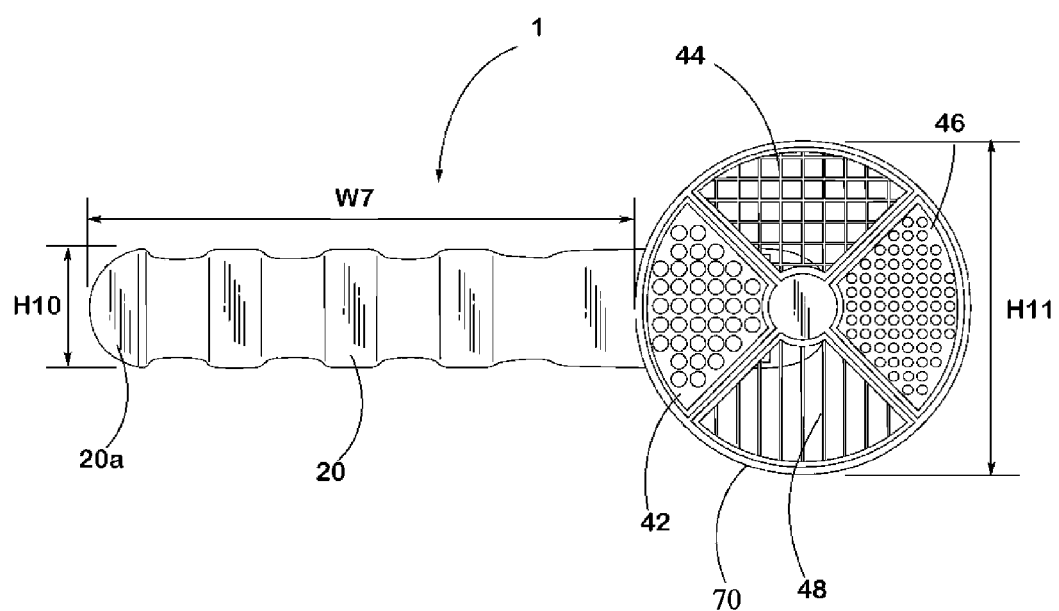
FIG. 6 shows a bottom view of the garlic press of FIG. 1 in the compressed state.

The distance, W7, shown in FIG. 6 from the end 20a of the bottom handle device 20 to the proximal end of the circular structure 70 may be 4.55 inches. The bottom handle device 20 may have a width of one inch. The circular structure 70 may have an outer diameter of H11 shown in FIG. 6, which may be 2.78 inches.

Figure 7:
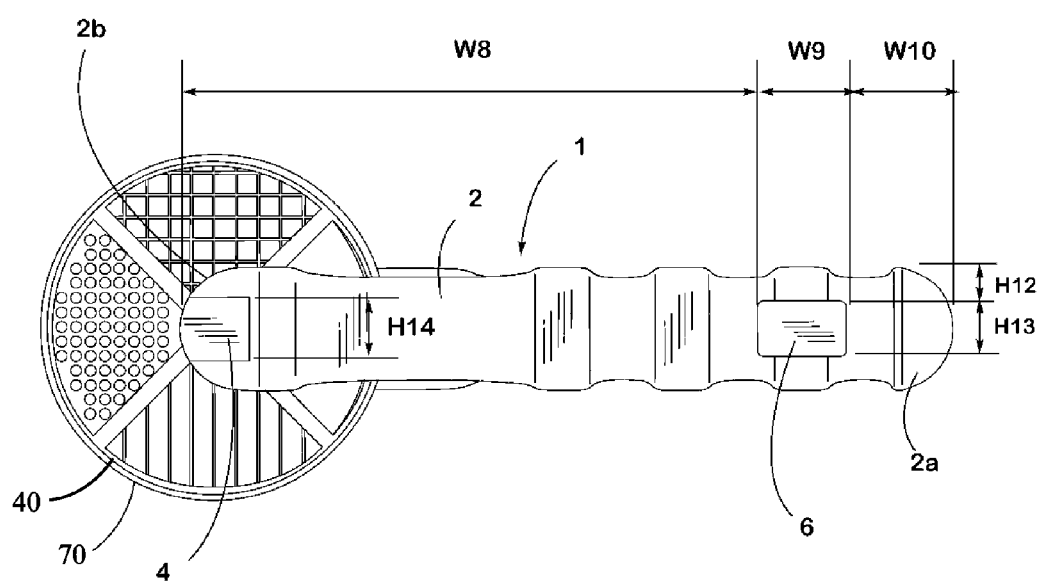
FIG. 7 shows a top view of the garlic press of FIG. 1 in the compressed state.

The width of device 4 may be H14 shown in FIG. 7, which may be 0.5 inches. The top handle device 2 may have a length, W8, from the end 2b to the logo section 6, which may be 4.6 inches. The logo section 6 may have a length, W9, shown in FIG. 7, which may be 0.73 inches. The length from the proximal end of the logo section 6 to the end 2a may be W10 which may be 0.87 inches. The width of the logo section, H13, may be 0.44 inches, and the distance H12 of a proximal end of logo section 6 to a side of top handle device 2 may be 0.28 inches.

Figure 8:
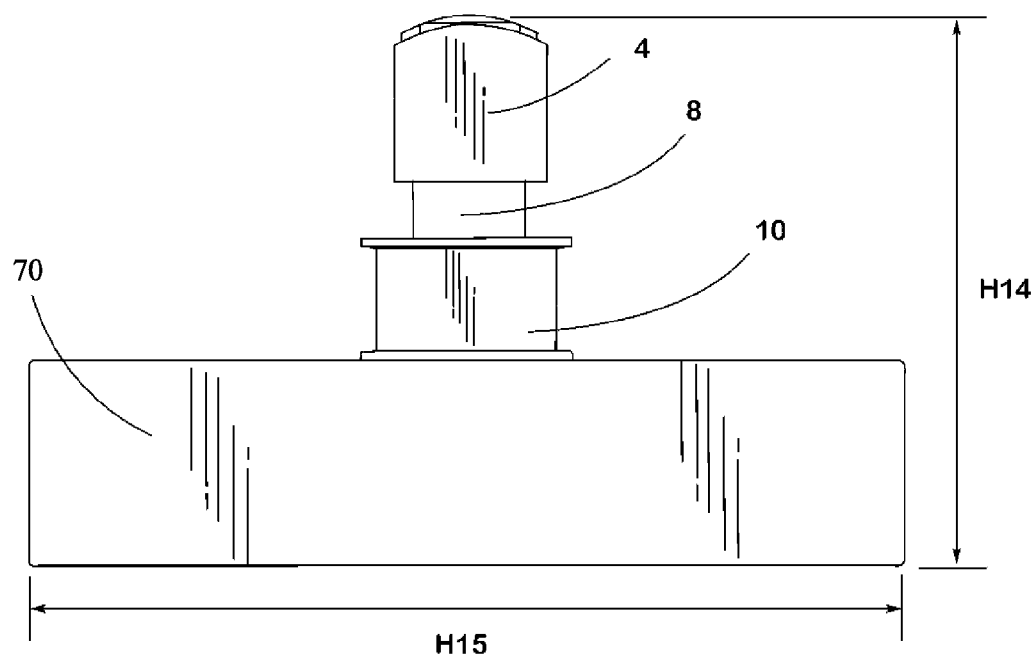
FIG. 8 shows a front view of part of the garlic press of FIG. 1, with a top handle removed.
Figure 9:
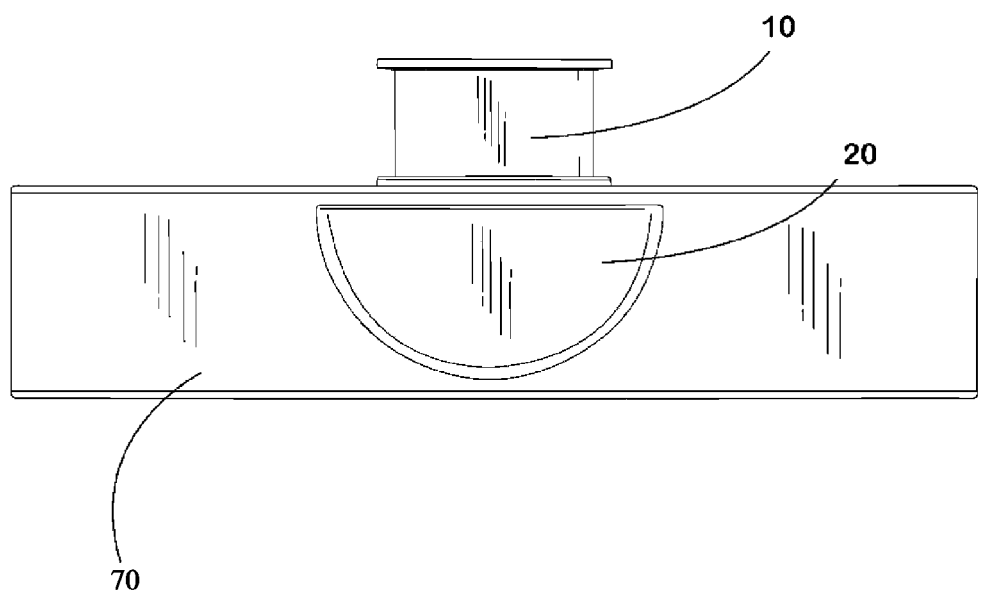
FIG. 9 shows a back view of part of the garlic press of FIG. 1 with the top handle removed.
Figure 10:
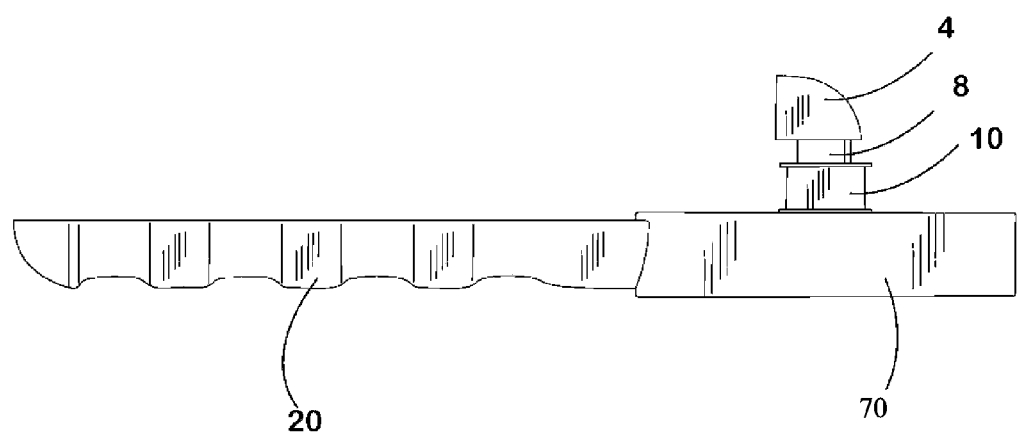
FIG. 10 shows a left side view of part of the garlic press of FIG. 1 with the top handle removed.
Figure 11:
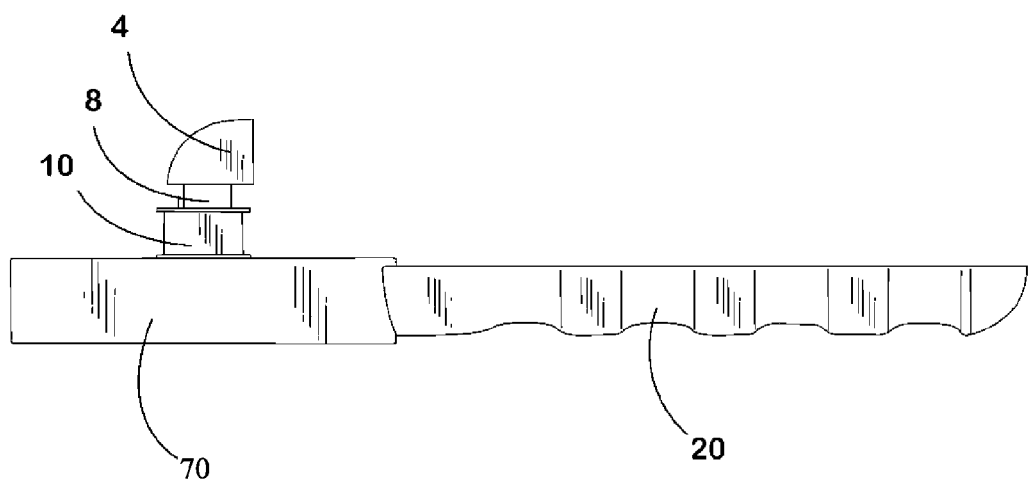
FIG. 11 shows a right side view of part of the garlic press of FIG. 1 with the top handle removed.

The height H14 from the top of device 4 to the distal end of circular structure 70 may be 1.61 inches as shown in FIG. 8. The diameter of circular structure 70 may be 2.78 inches.

Figure 18:
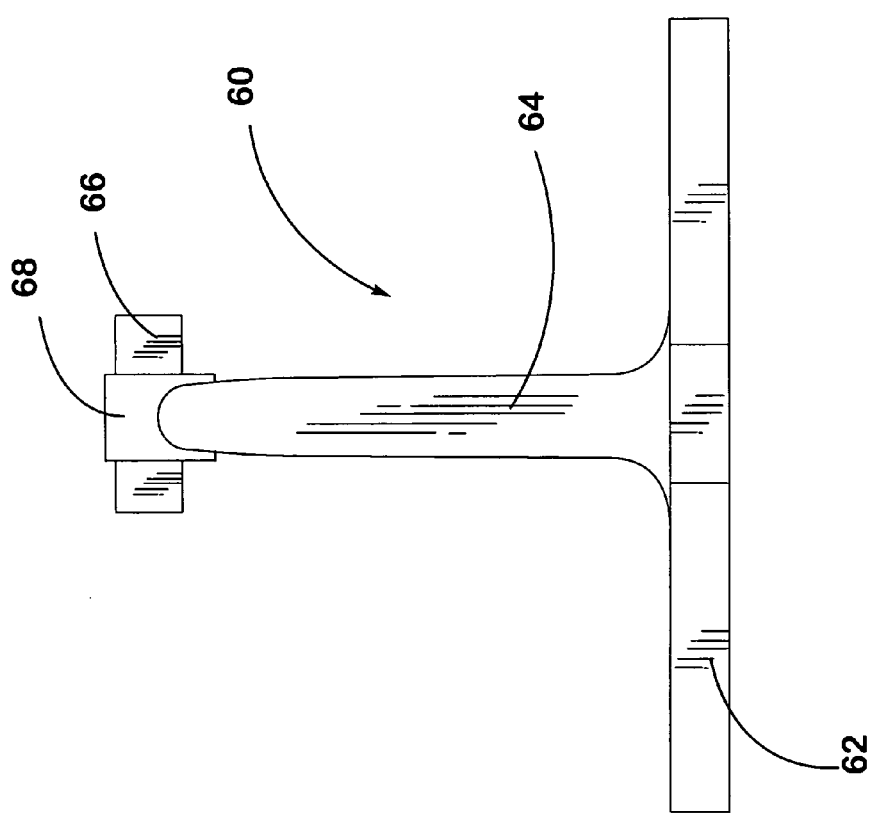
FIG. 18 shows a front view of the plunger.
Figure 19:
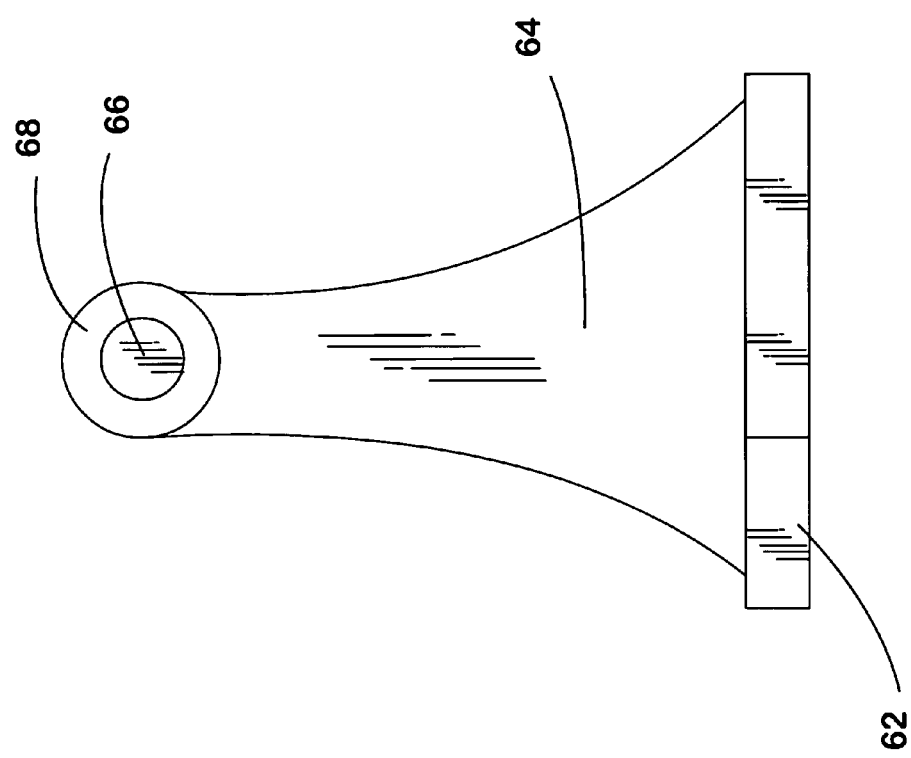
FIG. 19 shows a left side view of the plunger.
Figure 20:
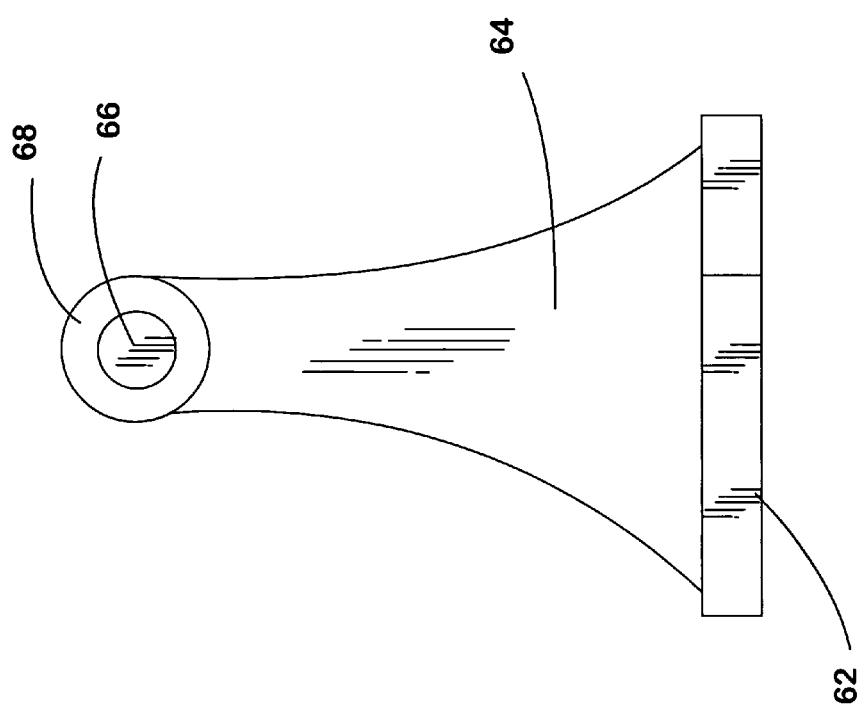
FIG. 20 shows a right side view of the plunger.
Figure 21:
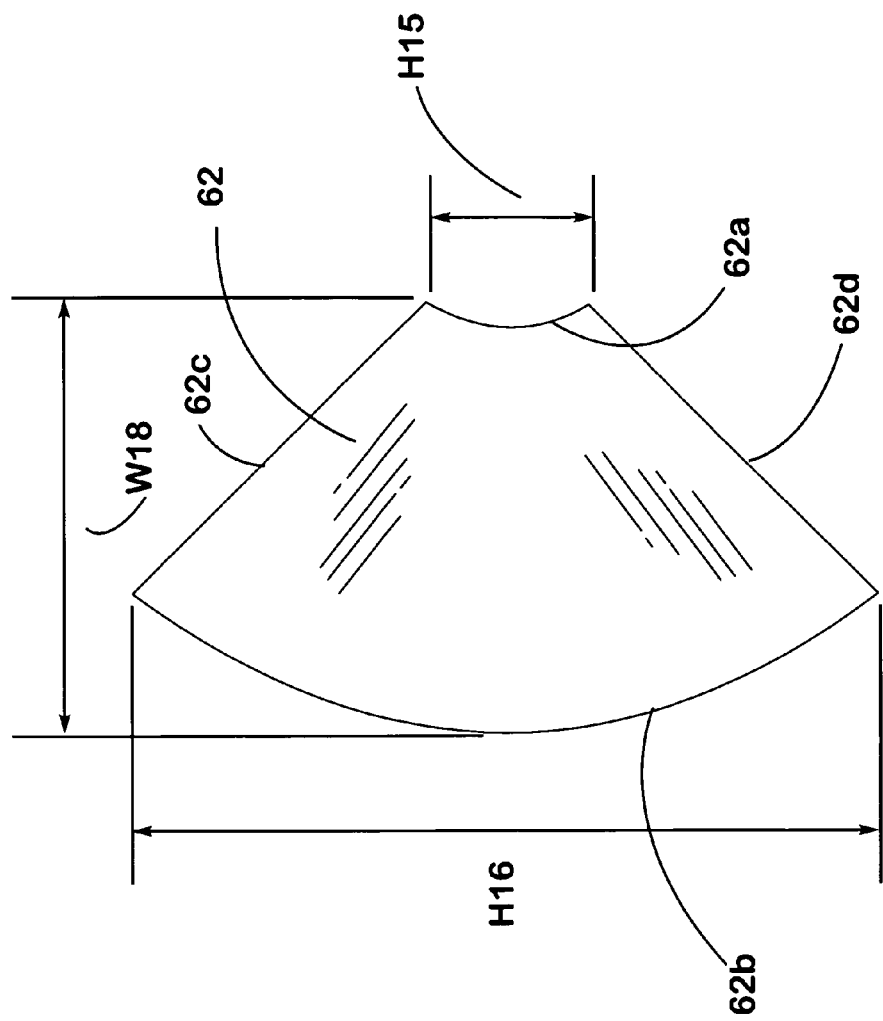
FIG. 21 shows a bottom view of the plunger.
Figure 23:
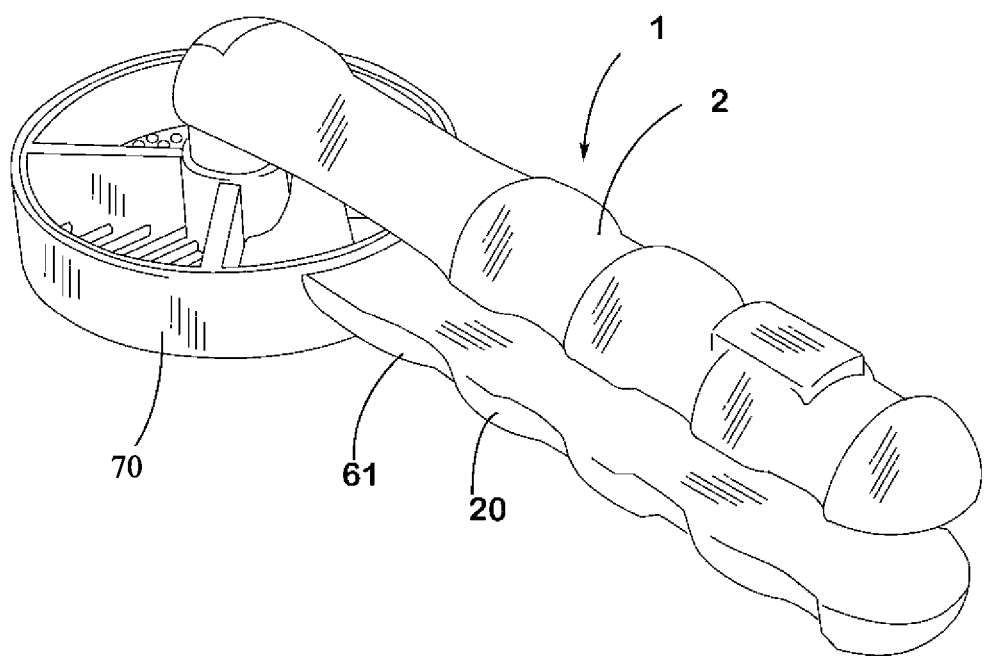
FIG. 23 shows a top back right side perspective view of the garlic press of FIG. 1 in a compressed state.

The width W15 of the section 66 of the plunger 60 shown in FIG. 18 may be 0.44 inches. The width W16 of the section 68 may be 0.19 inches. The width, W17 of the largest arc length of section 62 of plunger 60 may be 1.67 inches. As shown in FIG. 22, the width H16 of the plunger section 62 may be 1.65 inches. Also, as shown in FIG. 22, the width W18 may be 0.97 inches and the height H15 may be 0.40 inches. As shown in FIG. 23, the width W19 of the section 66 may be 0.14 inches and the height or width H17 may be 0.44 inches.

FIGS. 8, 9, 10, 11, and 12 show front, back, left side, right side, and bottom views, respectively, of part of the garlic press 1 of FIG. 1, with the top handle device 2 removed. In FIG. 12 the lower handle device 20, the circular structure 70, and the axial structures 71a, 71b, 71c, and 71d are shown without the wheel 40.

Figure 13:
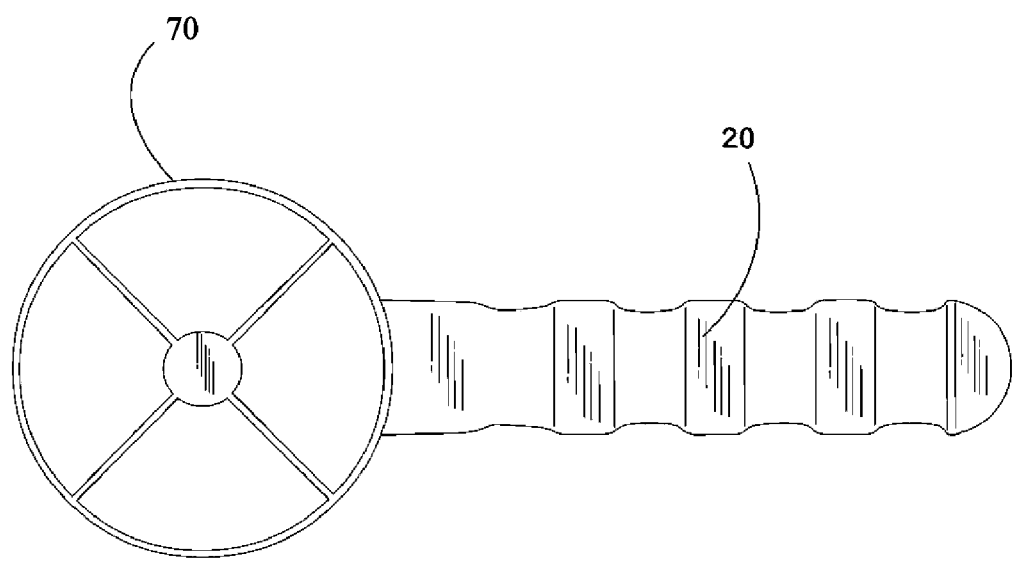
FIG. 13 shows a top view of a lower handle and the wheel of the garlic press of FIG. 1, with portions of the wheel removed.

FIG. 13 shows a top view of the lower handle device 20 and the circular structure 70 and the axial structures 71a, 71b, 71c, and 71d without the wheel 40. FIG. 14 shows a top front perspective view of the wheel 40 of the garlic press 1.

FIGS. 15 and 16 show back and top views of the wheel 40.

FIGS. 17, 18, 19, 20, 21, and 22 show back, front, left side, right side, bottom, and top views of the plunger 60.

Figure 24:
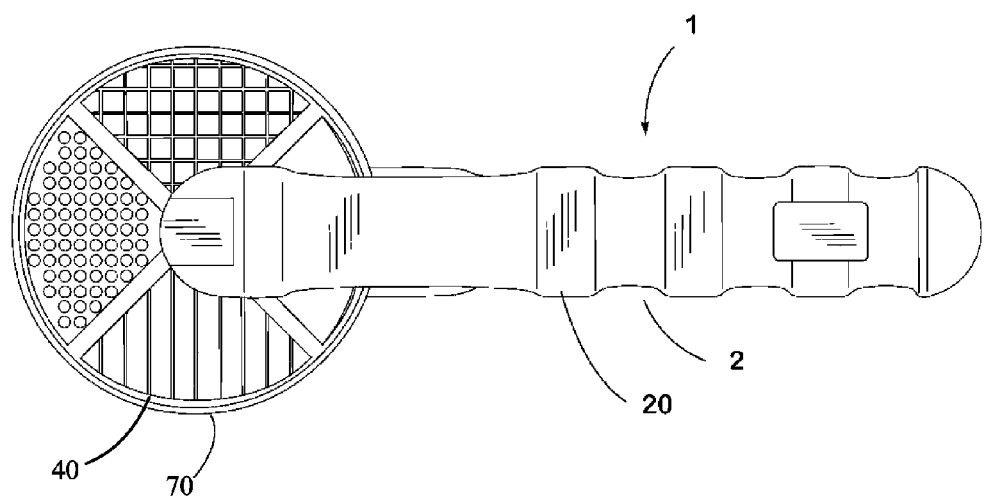
FIG. 24 shows a top view of the garlic press of FIG. 1 in a compressed state.
Figure 25:
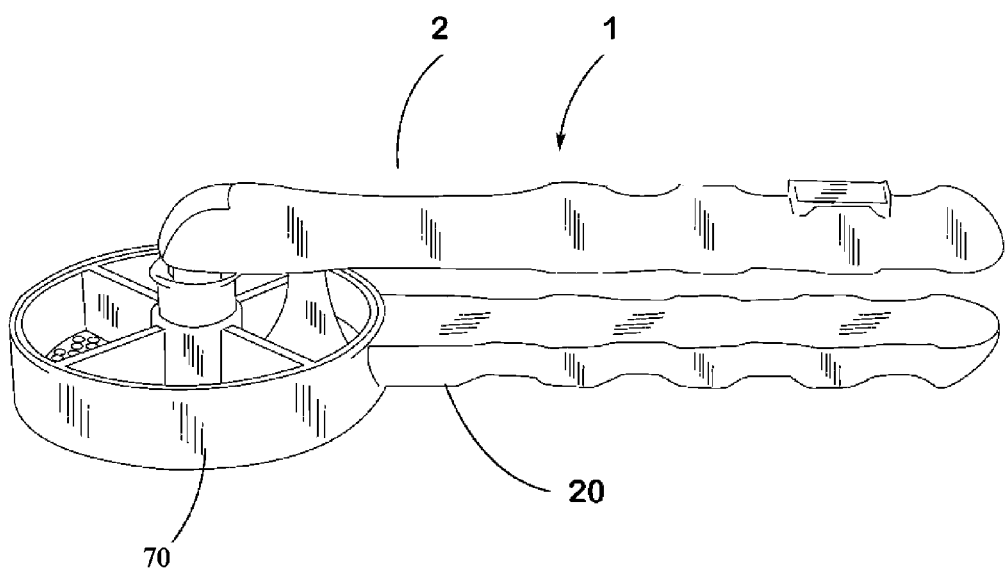
FIG. 25 shows a top right side perspective view of the garlic press of FIG. 1 in a compressed state.

FIGS. 23, 24, and 25 show a top back right side perspective, top, and top right side perspective views of the garlic press 1 in a compressed state.

Figure 26:
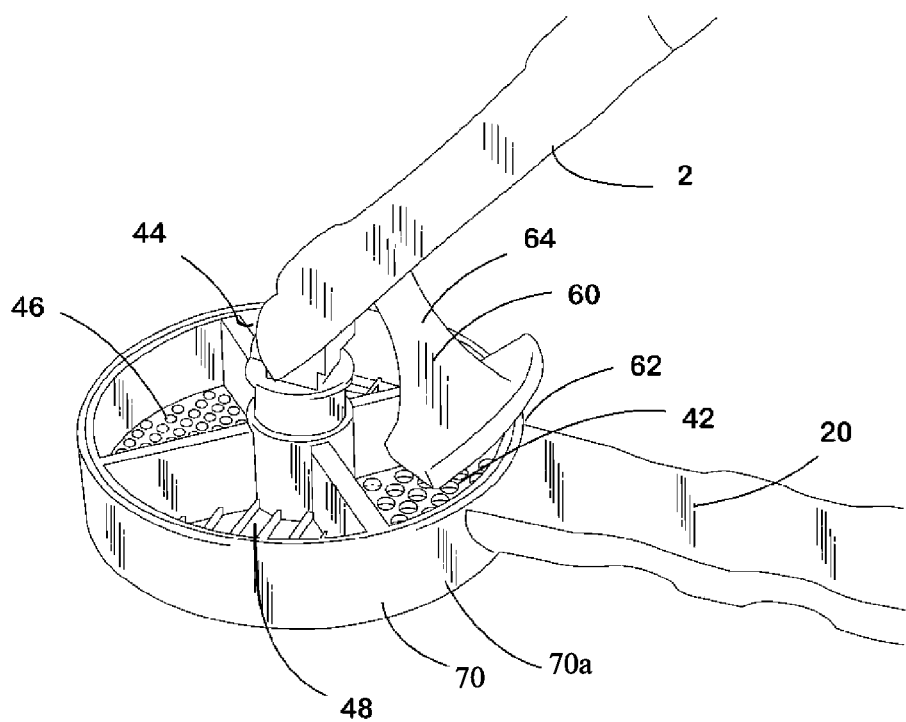
FIG. 26 shows a top right side perspective view of a portion of the garlic press of FIG. 1 in an opened state.

FIG. 26 shows a top right side perspective view of a portion of the garlic press 1 of FIG. 1 in an opened state.

In operation, an individual separates the top handle device 2 and the bottom handle device 20 into an opened state, such as in FIG. 26, thereby lifting the plunger 60 so it is not in contact with any of the sections 42, 44, 46, and 48, and typically not within the peripheral wall 40a or the not within any of the walls 45a-45d shown in FIG. 16. The individual then places a portion of garlic, such as a slice or clove of garlic, into one of the sections 42, 44, 46, or 48. The individual then rotates the wheel 40 with respect to the top handle device 2 so that the portion 62 of the plunger is aligned with one of the pie section interiors of the sections 42, 44, 46, or 48. The individual then presses down on the top handle device 2 until the portion 62 of the plunger 60 comes in contact with the garlic in one of the sections 42, 44, 46, or 48.

The garlic press 1 provides a four-in-one garlic tool accommodating a plurality of and in one or more embodiments virtually all garlic recipes. The top and bottom handle devices 2 and 20 provide an elongated resilient overall handle that includes ergonomic features. At the ends 2b and 20b the top and bottom handle devices 2 and 20 in one or more embodiments provide the overall circular structure 70 that is divided by the four axial structures 71a, 71b, 71c, and 71d. The four axial structures 71a, 71b, 71c, and 71d serve to receive the extrusion basket or wheel 40 that is comprised of four different extrusion configurations or sections 42, 44, 46, and 48, that include a plurality of section 46 of small extrusion holes, a section or well 44 provides a grid or square structure that creates a Julian cut, section or well 48 provides a structure that includes slots that dice the clove, and lastly section 42 provides a plurality of larger holes for a more course extrusion. The basket or wheel 40, shown in FIGS. 1 and 26, is rotated to a position so that the plunger section 62 of the plunger 60 is aligned over one of the sections 42, 44, 46, or 48. The plunger 60 is then pressed downwards causing the plunger section 62 to be inserted into whatever section of the sections 42 (for course press), 44 (for julienne press), 46 (for fine press), and 48 (for slice press), that plunger section 62 was aligned over. In one example, for section 44 (julienne press) the extrusion plunger 60 is locked in place when the slots 52 and 54 shown in FIG. 14 and FIG. 15 44 of the basket or wheel 40 shown in FIG. 26 nest into the inner straight walls or axial structures 71a, 71b, 71c, and 71d, shown in FIG. 12 of the lower or bottom handle device 20.

The rotational approach of providing a wheel like structure, such as basket or wheel 40 in one or more embodiments of the present invention minimizes the storage space required providing a significant user benefit. In at least one embodiment of the present invention, the larger and long handles, for top handle device 2 and bottom handle device 20 shown in FIG. 1, provide improved leverage, traction, and control in the wet and lubricious food preparation environment.

In at least one embodiment of the present invention an EDM (Electronic Digital Machine) texturized finish can be provided for one or all of the outer surfaces of the top handle device 2 and the bottom handle device 20 to provide improved grip and traction. The plurality of handle recesses or indented portions, such as 2f, 2h, and 2j for the top handle device 2, and 20d, 20f, 20h, and 20j for bottom handle device 20 shown in FIG. 4 provide a cueing feature and improved grip when pressing a garlic clove with the plunger section 62 using handle devices 2 and 20. The raised longitudinal knurls, such as ridged portions or protruding portions 2e, 2g, 2i, and 2k for the top handle device 2, and ridged portions or protruding portion 20e, 20g, 20i, and 20k shown in FIG. 4 provide additional traction and grip.

The basket or wheel 40 and use of axial spokes 45a-d shown in FIG. 16 provides a secure placement for garlic when extruding garlic. The plunger 60 in the preferred embodiment may be pivotally attached to the upper handle assembly or top handle device 2 by way of a hardened steel or titanium pin, such as pin 66 shown in FIG. 17. In another embodiment the plunger 60 may be integrated with the top handle device 2 by casting so that there would not be any pivotal movement between the plunger 60 and the top handle device 2.

Although the fine pressing section 46, coarse pressing section 42, julienne section 44, and slicing section 48 extrusion sections shown in FIG. 14, represent the majority of extrusions for garlic preparation, other embodiments may include somewhat larger and somewhat smaller configurations of the aforementioned.

The handle assembly, which may include top handle device 2 and bottom handle device 20, can be constructed of food grade materials including nylon, polycarbonate, ABS (acrylonitrile-butadiene-styrene), or any other suitable thermal plastic material. Alternatively, the entire unit including top handle device 2 and bottom handle device 20 could be die-cast of any suitable material such as aluminum or zinc. In the preferred embodiment, the lower handle assembly or bottom handle device 20 is die-cast and then a thermal plastic material is overmolded on top of the die-casting. Likewise the upper handle assembly or top handle device 2 is die-cast with a plastic overmolded on top of a metal structure. Another embodiment would include a friction fit silicon or other elastomeric cover that is affixed to a metal assembly as a secondary process. In yet another embodiment, the entire assembly including top handle device 2 and bottom handle device 20 includes would be constructed of all metal with not plastic components.

In the preferred embodiment the basket assembly or wheel 40 would be die-cut in order to create the general structure of the basket assembly or wheel 40 including the extrusions or sections 42, 44, 46, and 48 and holes, openings, or slots within the extrusions or sections 42, 44, 46, and 48. A secondary stainless steel insert not shown can be fitted into which sections 48 and 44 for the julienne and slicing feature. These stainless steel inserts would be installed into the basket assembly or wheel 40 as a secondary process. In at least one embodiment, all of the materials selected for the invention would be made of FDA (Food and Drug Administration) food contact approved materials and would be suitable for temperatures necessary to make them dishwasher safe.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus for pressing a food item into a plurality of sliced configurations comprising:
   a top handle device;
   a bottom handle device;

a wheel; and a plunger;

wherein the top handle device is connected to the wheel and wherein the bottom handle device is connected to the wheel so that the wheel rotates with respect to the top handle device;

wherein the plunger is fixed to the top handle device;

wherein the wheel has a plurality of sections into which a portion of the plunger can be inserted in order to press a food item into a sliced configuration; and wherein the wheel includes a peripheral wall substantially surrounding the plurality of sections and substantially defining a shape having an inner area;

wherein the plurality of sections includes a first section which takes up a first part of the inner area, and a second section which takes up a second part of the inner area, wherein there is no overlap between the first part of the inner area and the second part of the inner area;

wherein the plunger is configured with respect to the wheel, so that the portion of the plunger can be put into a first state in which the portion of the plunger is within the peripheral wall and overlaps the first part of the inner area but does not overlap any other part of the inner area, and no other portion of the plunger is within the peripheral wall and overlaps any part of the inner area other than the first part of the inner area; and wherein the plunger is configured with respect to the wheel, so that the portion of the plunger can be put into a second state in which the portion of the plunger is within the peripheral wall and overlaps the second part of the inner area but does not overlap any other part of the inner area, and no other portion of the plunger is within the peripheral wall and overlaps any part of the inner area other than the second part of the inner area.

2. The apparatus of claim 1 wherein
the top handle device has a first end which is connected to the wheel and a second end;
and wherein the plunger is fixed to an underside of the top handle device, near the first end of the top handle device, and substantially perpendicular to the top handle device.

3. The apparatus of claim 1 wherein
the plunger fits snugly into each of the plurality of sections.

4. The apparatus of claim 1 wherein
the plunger has a substantially pie shaped section which fits snugly into each of the plurality of sections.

5. An apparatus for pressing a food item into a plurality of sliced configurations comprising:

a top handle device;

a bottom handle device;

a wheel; and a plunger;

wherein the top handle device is connected to the wheel and wherein the bottom handle device is connected to the wheel so that the wheel rotates with respect to the top handle device;

wherein the plunger is fixed to the top handle device;

wherein the wheel has a plurality of sections into which a portion of the plunger can be inserted in order to press a food item into a sliced configuration;

wherein the plurality of sections of the wheel include first, and second sections; and wherein each of the first and second sections of the wheel are bounded by walls, and wherein each of the first, and second sections of the wheel have a set of extrusion openings which are different from the other sections of the first and second sections of the wheel.

6. The apparatus of claim 5 wherein
each of the extrusion openings of the set of extrusion openings of the first section is in the form of a circular hole; and
each of the extrusion openings of the set of extrusion openings of the second section is in the form of a circular hole which is larger than the circular hole of the first section.

7. The apparatus of claim 6 wherein
the set of extrusion openings of the first section are configured to create a first set of cylinders of a food item when the plunger presses the food item; and
the set of extrusion openings of the second section are configured to create a second set of cylinders, which are larger than the first set of cylinders, of a food item when the plunger presses the food item.

8. The apparatus of claim 5 wherein
the plurality of sections of the wheel further include third and fourth sections; and
wherein each of the third, and fourth sections of the wheel are bounded by walls, and wherein each of the first, second, third, and fourth sections of the wheel have a set of extrusion openings which are different from the other sections of the first, and second, third, and fourth sections of the wheel.

9. The apparatus of claim 8 wherein
each of the extrusion openings of the set of extrusion openings of the first section is in the form of a circular hole;
each of the extrusion openings of the set of extrusion openings of the second section is in the form of a circular hole which is larger than the circular hole of the first section;
each of the extrusion openings of the set of extrusion openings of the third section is in the form of an elongated slots; and
each of the extrusion openings of the set of extrusion openings of the fourth section is in the form of a substantially square opening.

10. The apparatus of claim 9 wherein
the set of extrusion openings of the first section are configured to create a first set of cylinders of a food item when the plunger presses the food item;
the set of extrusion openings of the first section are configured to create a second set of cylinders, which are larger than the first set of cylinders, of a food item when the plunger presses the food item;
the set of extrusion openings of the third section are configured to dice a food item when the plunger presses the food item; and
the set of extrusion openings of the fourth section are configured to Julian cut a food item when the plunger presses the food item.

11. An apparatus for pressing a food item into a plurality of sliced configurations comprising:

a top handle device;

a bottom handle device;

a wheel; and a plunger;

wherein the top handle device is connected to the wheel and wherein the bottom handle device is connected to the wheel so that the wheel rotates with respect to the top handle device;

wherein the plunger is fixed to the top handle device;

wherein the wheel has a plurality of sections into which a portion of the plunger can be inserted in order to press a food item into a sliced configuration;

wherein the top handle device is connected to the wheel so that the top handle device can rotate in a first plane which is substantially parallel to the wheel and to the bottom handle device and so that the top handle device can rotate in a second plane which is substantially perpendicular to the wheel and the bottom handle device.

12. A method comprising
using an apparatus to press a food item into one of a plurality of sliced configurations;
wherein the apparatus is comprised of
a top handle device;
a bottom handle device;
a wheel; and
a plunger;
wherein the top handle device is connected to the wheel and wherein the bottom handle device is connected to the wheel so that the wheel rotates with respect to the top handle device;
wherein the plunger is fixed to the top handle device;
wherein the wheel has a plurality of sections into which a portion of the plunger can be inserted in order to press a food item into a sliced configuration;
wherein the wheel includes a peripheral wall substantially surrounding the plurality of sections and substantially defining a shape having an inner area;
wherein the plurality of sections includes a first section which takes up a first part of the inner area, and a second section which takes up a second part of the inner area, wherein there is no overlap between the first part of the inner area and the second part of the inner area;
wherein the plunger is configured with respect to the wheel, so that the portion of the plunger can be put into a first state in which the portion of the plunger is within the peripheral wall and overlaps the first part of the inner area but does not overlap any other part of the inner area, and no other portion of the plunger is within the peripheral wall and overlaps any part of the inner area other than the first part of the inner area; and
wherein the plunger is configured with respect to the wheel, so that the portion of the plunger can be put into a second state in which the portion of the plunger is within the peripheral wall and overlaps the second part of the inner area but does not overlap any other part of the inner area, and no other portion of the plunger is within the peripheral wall and overlaps any part of the inner area other than the second part of the inner area.

13. The method of claim 12 wherein
the top handle device has a first end which is connected to the wheel and a second end;
and wherein the plunger is fixed to an underside of the top handle device, near the first end of the top handle device, and substantially perpendicular to the top handle device.

14. The method of claim 12 wherein
the plunger fits snugly into each of the plurality of sections.

15. The method of claim 12 wherein
the plunger has a substantially pie shaped section which fits snugly into each of the plurality of sections.

16. A method comprising
using an apparatus to press a food item into one of a plurality of sliced configurations;
wherein the apparatus is comprised of
a top handle device;
a bottom handle device;
a wheel; and
a plunger;
wherein the top handle device is connected to the wheel and wherein the bottom handle device is connected to the wheel so that the wheel rotates with respect to the top handle device;
wherein the plunger is fixed to the top handle device;
wherein the wheel has a plurality of sections into which a portion of the plunger can be inserted in order to press a food item into a sliced configuration;
wherein
the plurality of sections of the wheel include first, and second sections; and
wherein each of the first and second sections of the wheel are bounded by walls, and wherein each of the first and second sections of the wheel have a set of extrusion openings which are different from the other sections of the first and second sections of the wheel.

17. The method of claim 16 wherein
each of the extrusion openings of the set of extrusion openings of the first section is in the form of a circular hole; and
each of the extrusion openings of the set of extrusion openings of the second section is in the form of a circular hole which is larger than the circular hole of the first section.

18. The method of claim 17 wherein
the set of extrusion openings of the first section are configured to create a first set of cylinders of a food item when the plunger presses the food item; and
the set of extrusion openings of the second section are configured to create a second set of cylinders, which are larger than the first set of cylinders, of a food item when the plunger presses the food item.

19. The method of claim 16 wherein
the plurality of sections of the wheel further include third and fourth sections; and
wherein each of the third, and fourth sections of the wheel are bounded by walls, and wherein each of the first, second, third, and fourth sections of the wheel have a set of extrusion openings which are different from the other sections of the first, second, third, and fourth sections of the wheel.

20. The method of claim 19 wherein
each of the extrusion openings of the set of extrusion openings of the first section is in the form of a circular hole;
each of the extrusion openings of the set of extrusion openings of the second section is in the form of a circular hole which is larger than the circular hole of the first section;
each of the extrusion openings of the set of extrusion openings of the third section is in the form of an elongated slots; and
each of the extrusion openings of the set of extrusion openings of the fourth section is in the form of a substantially square opening.

21. The method of claim 20 wherein
the set of extrusion openings of the first section are configured to create a first set of cylinders of a food item when the plunger presses the food item;
the set of extrusion openings of the first section are configured to create a second set of cylinders, which are larger than the first set of cylinders, of a food item when the plunger presses the food item;
the set of extrusion openings of the third section are configured to dice a food item when the plunger presses the food item; and
the set of extrusion openings of the fourth section are configured to Julian cut a food item when the plunger presses the food item.

22. A method comprising
using an apparatus to press a food item into one of a plurality of sliced configurations;
wherein the apparatus is comprised of
a top handle device;

a bottom handle device;
a wheel; and
a plunger;
wherein the top handle device is connected to the wheel and wherein the bottom handle device is connected to the wheel so that the wheel rotates with respect to the top handle device;
wherein the plunger is fixed to the top handle device;
wherein the wheel has a plurality of sections into which a portion of the plunger can be inserted in order to press a food item into a sliced configuration;

wherein
the top handle device is connected to the wheel so that the wheel can rotate in a first plane which is substantially parallel to the bottom handle device and so that the top handle device can rotate in a second plane which is substantially perpendicular to the wheel and the bottom handle device.

* * * * *